United States Patent
Bensberg

(10) Patent No.: US 12,461,854 B1
(45) Date of Patent: Nov. 4, 2025

(54) DATA STORAGE MANAGEMENT SYSTEM

(71) Applicant: SAP SE, Walldorf (DE)

(72) Inventor: Christian Bensberg, Heidelberg (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/743,234

(22) Filed: Jun. 14, 2024

(51) Int. Cl.
*G06F 12/02* (2006.01)
*G06F 16/22* (2019.01)

(52) U.S. Cl.
CPC ...... *G06F 12/0253* (2013.01); *G06F 16/2272* (2019.01); *G06F 2212/702* (2013.01)

(58) Field of Classification Search
CPC ............ G06F 12/0253; G06F 16/2272; G06F 2212/702
See application file for complete search history.

(56) References Cited

U.S. PATENT DOCUMENTS

| | | | |
|---|---|---|---|
| 11,481,321 B2 | 10/2022 | Bensberg et al. | |
| 11,580,016 B2 * | 2/2023 | Kale | G06F 12/0246 |
| 12,222,960 B2 * | 2/2025 | Luo | G06F 16/2379 |
| 2016/0110114 A1 * | 4/2016 | Moon | G06F 12/0246 711/103 |
| 2016/0210228 A1 * | 7/2016 | Tandel | G06F 12/0269 |
| 2019/0171559 A1 * | 6/2019 | Lee | G06F 12/0246 |
| 2020/0372004 A1 * | 11/2020 | Barber | G06F 7/08 |
| 2021/0326068 A1 * | 10/2021 | Li | H03M 13/05 |
| 2022/0382674 A1 * | 12/2022 | Wang | G06F 16/245 |
| 2023/0079621 A1 * | 3/2023 | Gupta | G06F 16/1748 707/664 |
| 2023/0145054 A1 * | 5/2023 | VanBenschoten | G06F 16/2379 707/620 |
| 2023/0205785 A1 * | 6/2023 | Katsipoulakis | G06F 9/466 707/613 |
| 2024/0126783 A1 * | 4/2024 | Wong | G06F 11/1474 |

* cited by examiner

*Primary Examiner* — Huawen A Peng
(74) *Attorney, Agent, or Firm* — Sterne, Kessler, Goldstein & Fox P.L.L.C.

(57) ABSTRACT

System, method, and various embodiments for a data storage management system are described herein. An embodiment operates by receiving a request to create an index based on a portion of a database, the portion comprising one or more entries that correspond to one or more ongoing transactions. The index is generated based on the portion of the database, and a subset of entries that correspond to one or more ongoing transactions are auto-committed prior to a completion of the one or more ongoing transactions. A command to rollback the request to create the index is detected. The index is scheduled for asynchronous garbage collection, that remove information associated with the generated index from both memory and disk based upon a completion of one or more parallel transactions. The information associated with the generated index is removed from both the memory and disk in accordance with the asynchronous garbage collection.

20 Claims, 7 Drawing Sheets

DATA STORAGE MANAGEMENT SYSTEM

BACKGROUND

The management of storage is an important part of a computing system. It is important for a system to be able to manage storage effectively, in terms of both adding and removing data items from both memory and disk. When a data item is no longer useful, the system needs to have mechanisms in place to remove the data item. Otherwise, these data items could accumulate within storage (memory and/or disk) and slow down processing, slow down system throughput, and consume additional and unnecessary resources.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for providing a data storage management system.

The management of storage is an important part of a computing system. It is important for a system to be able to manage storage effectively, in terms of both adding and removing data items from both memory and disk. When a data item is no longer useful, the system needs to have mechanisms in place to remove the data item. Otherwise these data items could accumulate within storage (memory and/or disk) and slow down processing, slow down system throughput, and consume additional and unnecessary resources.

Figure 1:
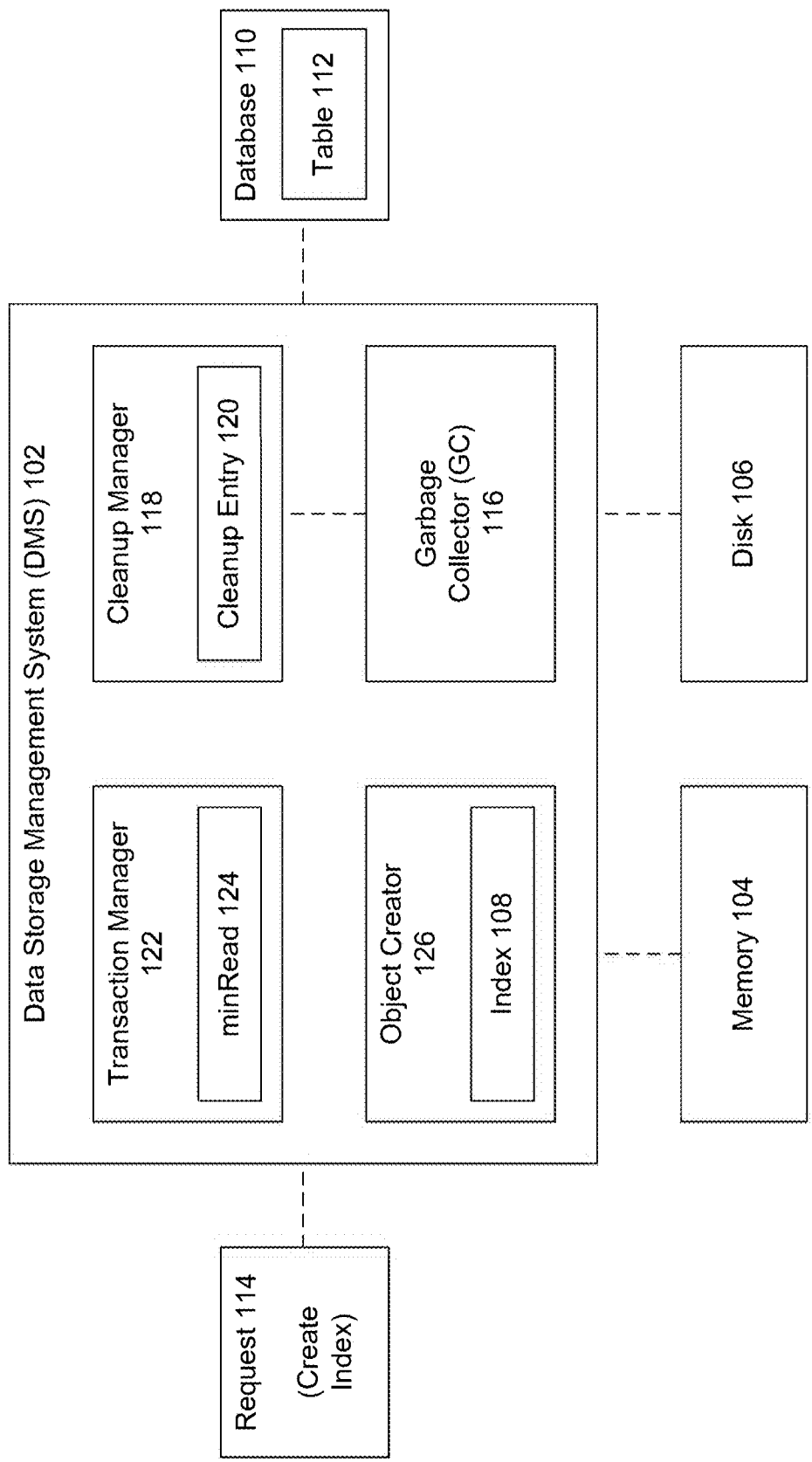
FIG. 1 is a block diagram illustrating example functionality for a data storage management system (DMS), according to some embodiments.

FIG. 1 is a block diagram 100 illustrating example functionality for a data storage management system (DMS) 102, according to some embodiments. DMS 102 may optimize the management of storage (e.g., memory 104 and disk 106) in the creation and deletion of various database objects or artifacts. For simplicity, the examples provided herein focus primarily on the creation of an index 108. However, it is understood that in other embodiments, DMS 102 may operate similarly with regards to the creation or management of data objects as well, such as a materialized view or a table. Also as used herein, the term "storage" may be used to generally refer to memory 104 and/or disk 106.

In database systems, when a new object is created, that object often includes data from the database 110 that the object will point to and/or data that will be copied or populated into the object. Example objects include tables, views, and indexes. In some embodiments, the database 110 may include both committed data and non-committed data. Committed data may include any data whose underlying (write) transaction has completed and the data has been committed to the disk 106. Non-committed data may include data that is part of an ongoing transaction, such as a write transaction, that may have written data to database 110 but not yet completed. The underlying transaction of non-committed data may be committed, rolled back, result in an error, or experience a system crash or other failure prior to completion.

If a new object, such as an index 108, includes non-committed data, DMS 102 may perform an auto-commit on the non-committed data as part of generating the new object (e.g., index 108). This may allow DMS 102 to provide the most up-to-date version of data for the new object, and for other transactions to access the data of the object. DMS 102 may perform or execute the auto-commit function before the corresponding or underlying transaction, that created or wrote the data, completes (e.g., commits, fails, or is rolled back). While the auto-commit transaction may improve efficiency in those cases when the underlying transaction completes successfully and is committed, issues may arise if the underlying transaction fails or is rolled back after the auto-commit has occurred. DMS 102 may be configured to garbage-collect or clean up the auto-committed data in such cases.

For example, a write transaction may include an insert command of data X into a table 112 of database 110. The data X may be written to the table 112 as part of the write transaction, however the write transaction may continue for a longer period of time after writing data X to table 112. While the write transaction is still ongoing (e.g., before the transaction has committed or been rolled back by a user), a request 114 to create an index on table 112 may be received. The index requested to be created may include an index the data for table 112, and may include data X for the ongoing write transaction. To create the index 108, DMS 102 may retrieve a copy of the data of table 112, including data X, and may auto-commit data X to disk 106 before the write transaction for X has completed, as part of generating or creating index 108. In some embodiments, index 108 has an independent lifecycle and may be created, queried, loaded, unloaded and dropped independently from table 112. If queried, index 108 may return a pointer to the record X in table 112. Table 112 is then checked to determine whether X is visible to the running transaction. If X was not part of index 108, the query might have returned a wrong result.

If the write transaction completes successfully (and data X is committed to disk 106), there is no data to clean up. However, if the write transaction for X fails or needs to be rolled back for any reason (e.g., such as user command to roll back, detections or write errors, system crash, etc.), after the auto-commit, then the DMS 102 may perform functionality that ensures that the auto-committed data X is removed from storage (disk 106 and/or memory 104). Otherwise, data from a rolled back transactions could continue to accumulate in storage (i.e., disk 106 and/or memory 104), consuming valuable storage space, increasing processing times, slowing down throughput, and producing incorrect data outputs. As such, DMS 102 may provide for efficient storage allocation and usage, including garbage collection and data clean up functionality, particularly for auto-committed data.

Upon detecting that a rollback of the write transaction is to be performed (from a user command or part of an error, failure, or system crash), DMS 102 may mark the data X (of the index 108) as deleted, failed, or not visible. However, because the database 110 may have multiple parallel ongoing transactions that have access to the data of index 108, including the auto-committed data X, the data X cannot immediately be removed from disk 106 and/or memory 104. DMS 102 may wait until any ongoing transactions that may be accessing the data X, in the index 108, have completed before garbage collecting or removing the data X from memory 104 and/or disk 106.

To remove data X from the database system while there are other ongoing transactions that may have access to data X, the system may use asynchronous garbage collection (AGC), as described in U.S. Pat. No. 11,481,321, which is hereby incorporated by reference in its entirety. In some embodiments, the processes of AGC may be incorporated into a garbage collector (GC) 116.

As noted above, in executing a rollback command, DMS 102 may first mark the data in index 108 to be rolled back (e.g., data X, not shown) as deleted or not visible. This marking of data X as being 'not visible' may prevent any subsequent transactions from accessing data X, even when accessing index 108. However, previously received and ongoing transactions may still be accessing data X, so data X cannot be garbage collected (e.g., removed from memory 104 and/or disk 106) at the time of rollback.

Then, for example, after the delete or rollback transaction has been executed (and data X has been marked as deleted), GC 116 may attach a cleanup entry 120 to the next received transaction (e.g., read or write transaction) for database 110, because the next transaction will not have access the data X which has been marked as deleted or not visible. The next transaction will also have a read timestamp after the rollback was detected. Once the next transaction completes (is committed), a cleanup manager 118 may receive the cleanup entry 120. The cleanup entry 120 may be an indicator that there is auto-committed data stored on disk 106 that needs to be removed or garbage collected. In some embodiments, the cleanup entry 120 may be assigned a commit timestamp (CTS) associated with the completion of the transaction to which the cleanup entry 120 was attached. For example, if the next transaction completes at time T5, then cleanup entry 120 may be assigned a timestamp of T5. (If the transaction to which the cleanup entry 120 is attached to is rolled back, the cleanup entry is re-attached to the next transaction that starts. This is repeated until a transaction eventually commits and a new CTS becomes available.)

In some embodiments, a transaction manager 122 may track a minRead timestamp 124. The minRead timestamp 124 may correspond to the lowest read timestamp for all the currently ongoing transactions on database 110. For example, if a transaction is received at time T4, then the transaction may be assigned a read timestamp of T4. And if there are multiple parallel or concurrent transactions (read and/or write) operating on database 110, the minRead timestamp 124 may indicate the smallest read timestamp of all the ongoing transactions. As the transaction with the lowest read timestamp completes, the minRead timestamp 124 may be updated or increased to the next lowest read timestamp of the then ongoing transactions.

In some embodiments, when minRead 124 is increased (e.g., because of a completion of an ongoing transaction with the smallest read timestamp), DMS 102 may compare the minRead 124 to the CTS of any cleanup entries 120. When DMS 102 detects that the minRead timestamp 124 exceeds the CTS associated with the cleanup entry 120, the data X (associated with the cleanup entry 120) may be garbage collected and removed from memory 104 and/or disk 106 by the cleanup manager 118 or GC 116.

In some embodiment, data X may immediately be removed from memory 104 and/or disk 106. In some embodiments, this cleanup of data X from disk 106 and/or memory 104 may occur on the next commit or disk access when the minRead 124 is greater than CTS of the cleanup entry 120. In other embodiments, the cleanup may occur any time after DMS 102 detects that minRead 124 is greater than CTS of the cleanup entry 120.

Figure 2A:
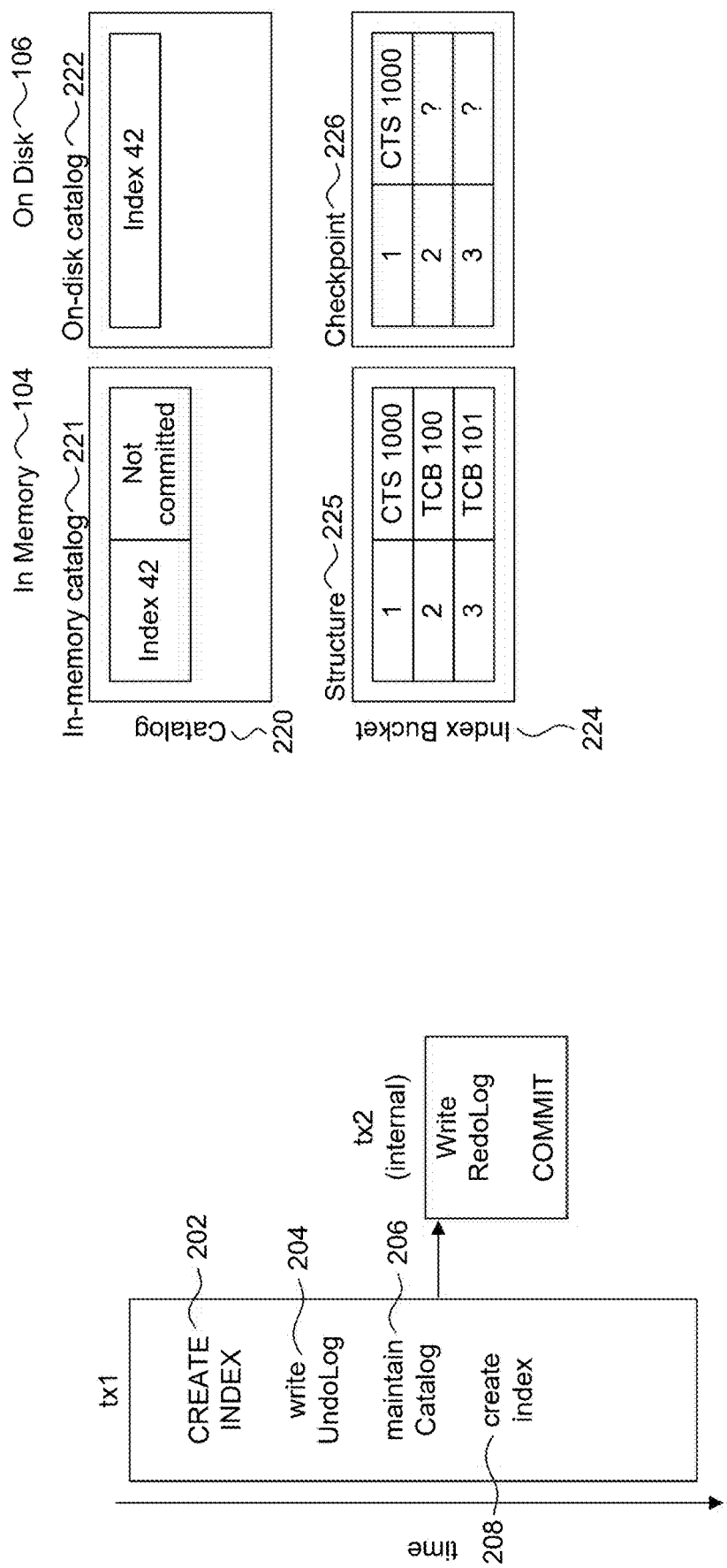
FIGS. 2A-2D illustrate example operations of a data storage management system (DMS), according to some embodiments.

FIGS. 2A-2D illustrate example operations of a data storage management system (DMS) 102, according to some embodiments. In FIG. 2A, at 202, a create index command may be received (e.g., similar to request 114). Returning to FIG. 1, an object creator 126 may be responsible for processing the create index command 202 or request 114. At 204, an undo log may be written. For example, object creator 126 may write an in-memory catalog 221 into memory 104 to assist in the cleanup process in the event of failure, errors, and/or rollback which may occur in the creation of the index 108, and after at least one auto-commit transaction.

In some embodiments, a catalog 220 may comprise of two portions, an in memory 104 portion referred to as in-memory log catalog 221 and an on disk 106 portion referred to as on-disk catalog 222. The writing of the in-memory log catalog 221 is different from conventional create index command processing (which may not write catalog either in-memory log catalog 221 or on-disk catalog 222 of catalog 220), and provides a utility that helps with cleanup and garbage collection functionality that may be utilized during the creation of database objects when auto-commit may be used.

In the example illustrated, the new index 108 (as generated by object creator 126) may be assigned an identifier or index ID of 42. In other embodiments, the identifier may be any alphanumeric and/or symbolic string of characters. The in-memory log catalog 221 may be used to track the creation or status of the new index 42 being created, until it is completed (committed to disk 106) or rolled back.

As illustrated, object creator 126 may generate a new entry the in-memory log catalog 221 of catalog 220 that includes both the index ID ("42") and the status ("not committed") for the new index 108. In some embodiments, an initial status may be set to 'not committed' or 'in progress' to indicate that the index is being created but has not yet been committed. Object creator 126 may also enter or create a new entry in the on-disk catalog 222 (as stored on disk 106) indicating that an index 42 was created or is being created, or that command 202 (e.g., request 114) was received to create the new index with ID 42.

In some embodiments, the log entry of on-disk catalog 222 may be auto-committed by DMS 102 to storage on disk 106. As will be discussed in greater below with regard to FIG. 2D, this auto-commit of the on-disk catalog 222 may be used or helpful with the cleanup of items stored on disk 106 in the event of a system crash or failure.

Index bucket 224 may be a memory representation of an index 108. Index 108 may include any data structure used to efficiently retrieve data. Index 108 may store references to or copies of data items, stored or retrieved across one or more tables 112 of database 110, allowing for quick access to the associated data based on some criteria, such as a key or value. In some embodiments, index bucket 224 may include both an in memory 104 portion referred to structure 225 and an on disk 106 portion referred to as checkpoint 226.

Checkpoint 226 may be used in the creation of an index 108 to ensure data consistency and durability. A checkpoint marks a point in the index creation process where all changes up to that point may be flushed to disk 106 for storage (e.g., committed and/or auto-committed). This may help prevent data loss or corruption in case of system failure during the index creation process. Checkpoint 226 may also allow for faster recovery and resume points if the index creation process needs to be restarted or is interrupted. In some embodiments, each checkpoint 226 may be associated with a timestamp as to when the checkpoint is committed to disk 106.

The values 1, 2, 3 may represent actual data values stored in the index (which do not need to be consecutive, but may be ordered from lowest to highest, or highest to lowest). In structure 225, the second value may be a timestamp indicating a status of a transaction that wrote the value in the first column (i.e., 1, 2, 3). The CTS (commit time stamp) may indicate a timestamp of when the corresponding transaction was committed. For example, the transaction that wrote value '1', was committed at timestamp 1000. TCB (transaction control block) may indicate a transaction that is still running. In some embodiments, TCB may be assigned an ordered identifier, such as 100 or 101, based on when the transaction began, was received, or initiated.

In checkpoint 226, as stored on disk 106, value '1', may include the same CTS 1000 as indicated in index bucket 224, as stored in memory 104, indicating that the value '1' has been committed. Values 2 and 3 however may include a '?', NULL, or other indicator that indicates that the fate of the corresponding transaction was still unknown at the time of writing to disk, because the transaction has not completed (e.g., been rolled back or committed).

In some embodiments, the index creation process may include initializing the data structures needed for the index (e.g. index bucket 224, including structure 225). At certain time intervals, or after certain amounts of data has been processed, a checkpoint 226 is created. During the checkpoint 226, the changes made to the index data structure may be flushed to disk 106. In the example illustrated, checkpoint 226 may be executed or created at time 1001 or later.

In parallel with the index construction, DMS 102 (e.g., object creator 126) may perform logging functionality to record the changes made the index data structures (as illustrated in on-disk catalog 222). This may provide DMS 102 a way to recover from failures by replaying the logged changes during the recovery process. If there is a failure, then the index creation process initiated when statement 202 was rolled back (or a rollback command was received). As a consequence, the created files on disk may need to be deleted. Conventionally, if a database object is created for a database, and the creation is rolled back, it is simply gone because no commit occurred (e.g., there is no auto-commit) and commit will only happen upon a completion of the creation process. However, as referenced above, in the creation of indexes (and other reference data structures that include, point to, or otherwise reference data stored across one or more tables 112), DMS 102 may perform auto-commit on data while the corresponding transactions are still ongoing, as part of creating these new database objects. Auto-commit is a database feature where a statement is automatically committed as soon as it is executed, without requiring a commit statement from a user. DMS 102 may use auto-commit of a sub-transaction to make parts of the data visible to other, parallel transactions instead of waiting for a manual commit transaction from user for the outer statement 202 running in tx1, which may still come later (or the transaction may result in a roll back) to help preserve system states in case of crash and improve overall efficiency and system throughput.

In some embodiments, index 108 may have its own lifecycle unique from underlying data stored across tables 112 of database 110. Index 108 may include a copy of data that is already stored across one or more tables 112. As such, the commit of an index 108 may be independent of a commit of the underlying data values. For completeness, the index 108 may include all written values (committed or not), however once the index 108 is created and committed (or auto-committed), the index 108 may being used by other transactions-which may have access to all the data of the index 108, including the non-committed data of ongoing transactions (which may or may not complete successfully).

In the example illustrated, without catalog 220 (including both in-memory log catalog 221 and on-disk catalog 222), if there is a crash in the midst of the index creation process, while structure 225 may be cleared from memory 104, checkpoint 226 which is stored on disk 106 may remain because there is no way for a conventional system to validate whether checkpoint 226 is valid/in use or is to be deleted.

At 206, object creator 126 may write the index 42 entry to the on-disk catalog 222 part of catalog 220. In some embodiments, as illustrated DMS 102 may execute a second internal transaction (tx 2), which illustrates an internal auto-commit process (not specifically requested by a user nor dictated by a failure or crash), during which the entry in the on-disk catalog 222 is stored to disk 106 as part of catalog 220. Auto-committing the on-disk catalog 222 may be beneficial if there is an error or crash, or another request to rollback the create index transaction 202. At 208, the index 108 may be created through the addition of entries to structure 225.

Figure 2B:
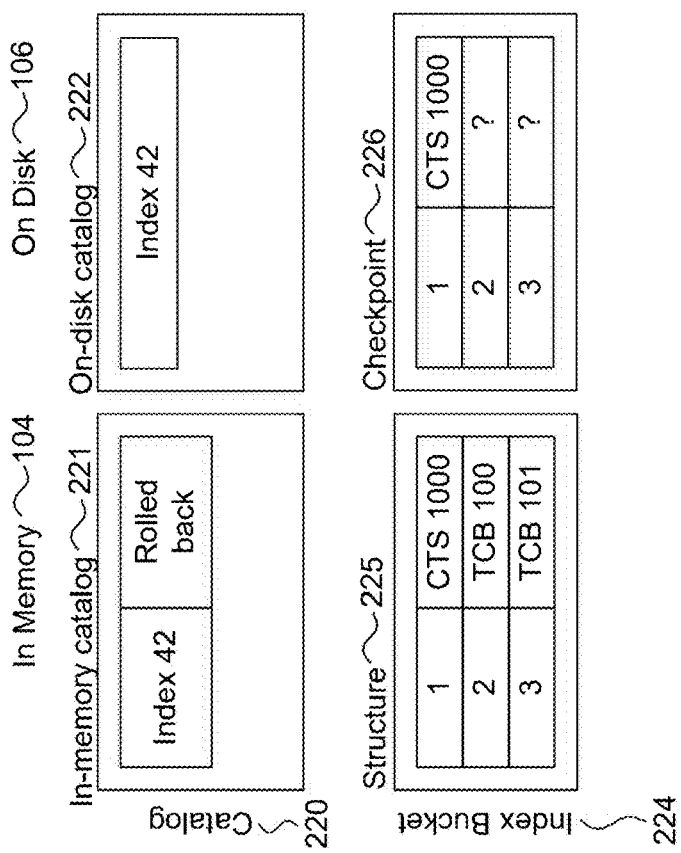
Figure 2B:
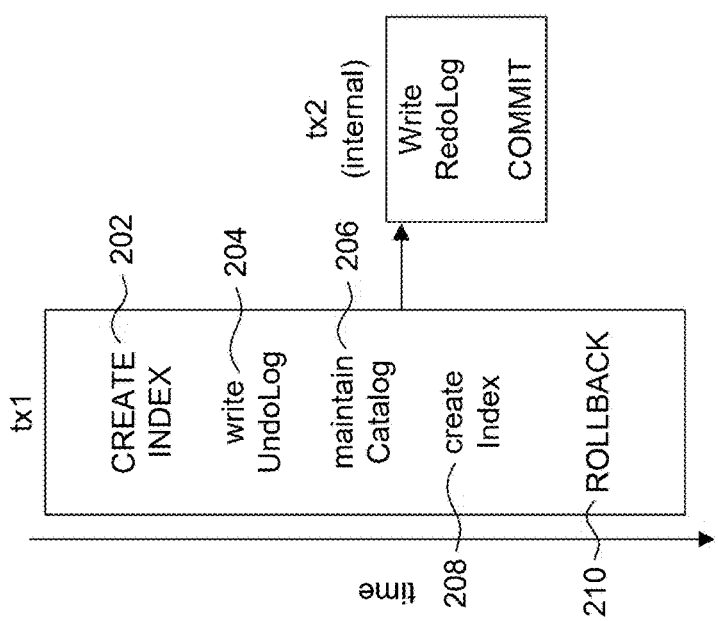

In FIG. 2B, at 210, request to rollback the create index command 202 may be received. The rollback request 210 may be implemented automatically upon detection of an error, such as running out of memory or storage, upon a detection of a failure or crash, or upon receipt of a rollback command from a user or another system. DMS 102 may update the status of index in catalog 220 to "rolled back". This updated status may prevent any new transactions from seeing, reading, or otherwise accessing the index 42.

As noted above, in executing the rollback command, the status of an already written value or object may be updated, however because there may be other processes or transactions accessing the data of index 42, the data of index 42 cannot yet be deleted. Thus, even though the index status may be updated to "rolled back", the data of the index may remain in memory 104 and on disk 106 as illustrated.

Figure 2C:
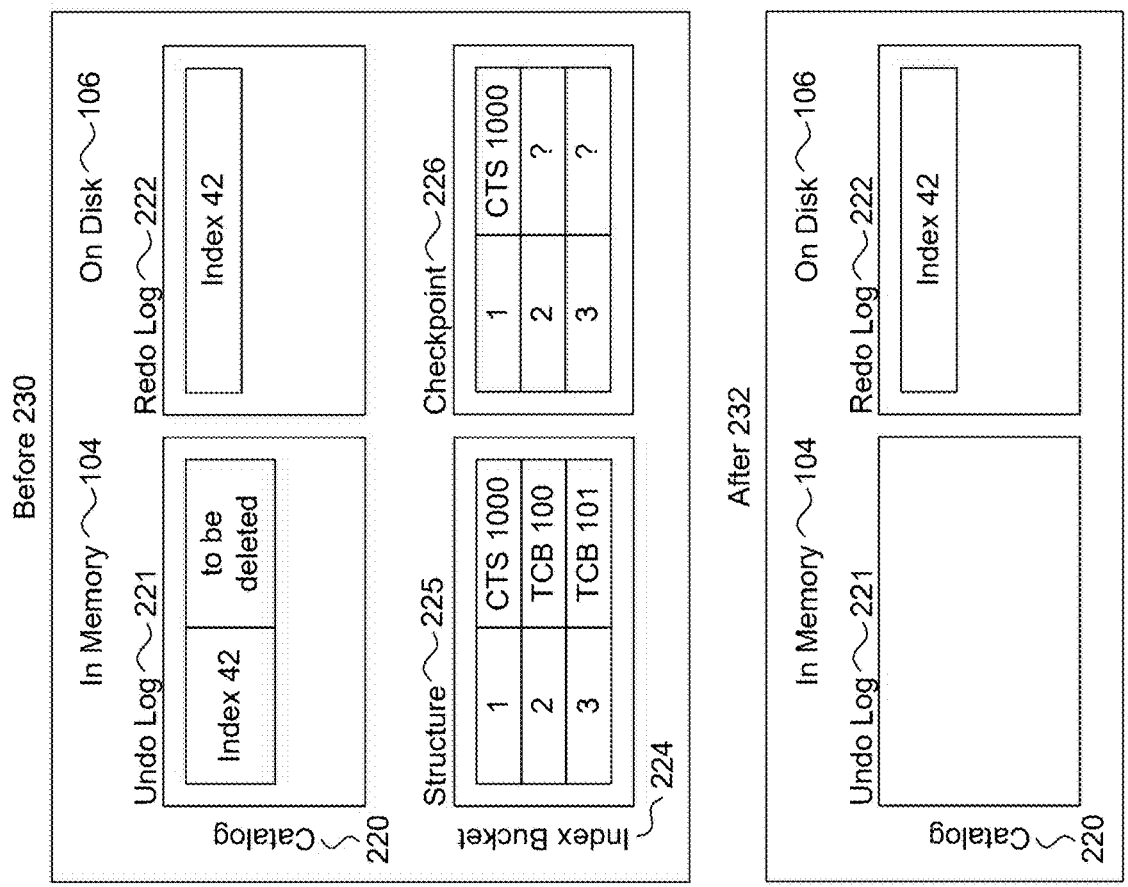
Figure 2C:
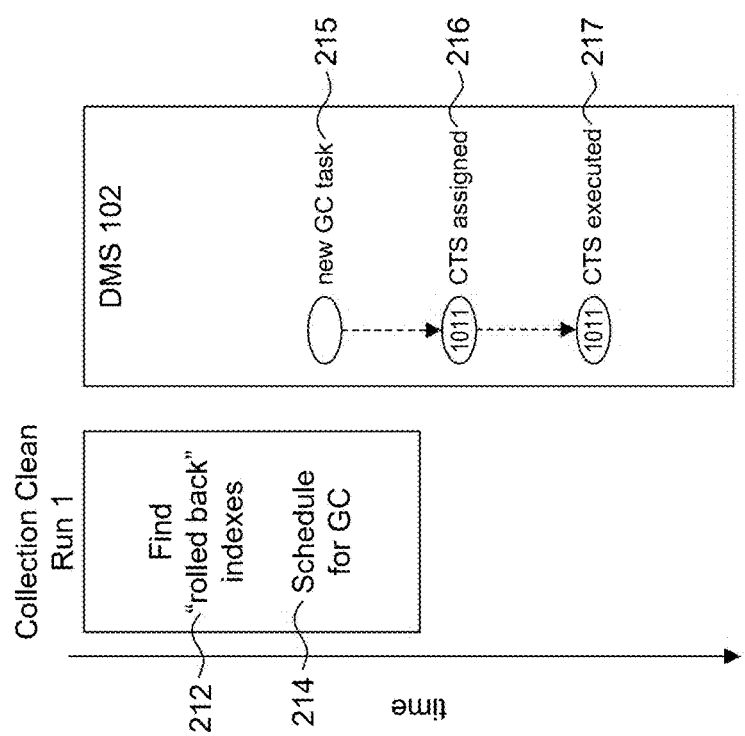

In FIG. 2C, at 212, DMS 102 may identify any indexes (or other data structures or transactions) with a current status of "rolled back", which may produce a result of index 42. At 214, DMS 102 may then provide the identified index 42 to GC 116 and cleanup manager 118 for garbage collection and cleanup. At 215, GC 116 may attach a new cleanup entry 120 to the next transaction received or executed on database 110. At 216, the next transaction may complete, and cleanup entry 120 may be assigned a CTS corresponding to the completion of the transaction. At 217, the cleanup entry 120 may be executed (at any time when the minRead timestamp 124 is greater than the CTS of cleanup entry 120. The execution of the cleanup entry 120 may include the removal or deletion of files from memory 104 and/or disk 106.

In the example illustrated, before box 230 may illustrate the states of memory 104 and disk 106 prior to the garbage collection and cleanup tasks illustrated in 212-217. Before box 230 may include an updated status of "to be deleted" for the index 42. After box 232 may illustrate the states of memory 104 and disk 106 after the garbage collection and cleanup tasks illustrated in 212-217.

In some example embodiments, as illustrated in after box 232, on-disk catalog 222 may include or maintain an entry corresponding to index 42, even though the corresponding entry has been removed from the in memory 104, catalog 220. DMS 102 may periodically, or during startup, a time when it is ensured that there are no parallel transactions, compare what is on the disk portion of catalog (of on-disk catalog 222) to the in memory portion of catalog 220 (e.g., in-memory log catalog 221) and delete anything from disk 106 that does not match anything in memory 104. In this example, since there is no corresponding entry in in-memory log catalog 221 to index 42 in on-disk catalog 222, the index 42 entry in on-disk catalog 222 may be deleted. In other example embodiments, the entry from on-disk catalog 222 may be deleted at the same time as checkpoint 226 and/or in-memory log catalog 221.

Figure 2D:
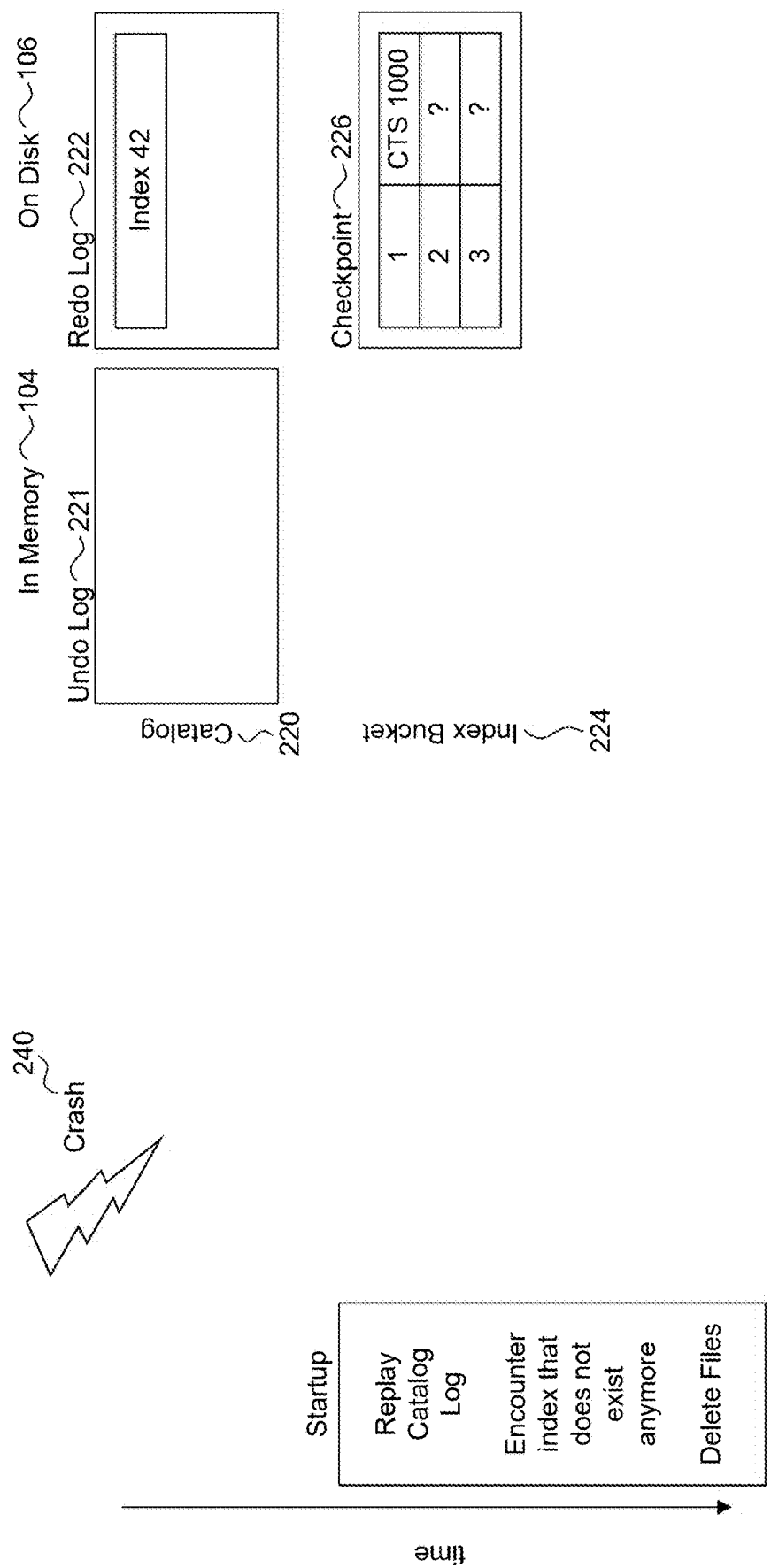

FIG. 2D illustrates a cleanup process after a crash 240. Crash 240 may include any system failure or crash (e.g., loss of power, connectivity, etc.). After a process, system, or device crash, the contents of memory 104 may be automatically cleared. After the crash 240, there may remain an entry for index 42 in on-disk catalog 222 and the checkpoint 226. DMS 102 may be configured to clear these artifacts from disk 106.

For example, upon reboot or startup, DMS 102 may compare in-memory log catalog 221 and on-disk catalog 222 of catalog 220. Because there is a mismatch, DMS 102 may clear, remove, or garbage collect any pieces of index 42 if existent in memory or on disk. In this case, after a crash, the in-memory structures are all gone, hence only disk cleanup is relevant. DMS 102 may clear the checkpoint 226 because there is no corresponding structure 225 in memory 104. The result of the operations of DMS 102 may be an empty memory 104 and empty disk 106 with regards to any files or data associated with the previously created index 42. This is the expected result, as due to the crash, the create index operation 202 could not commit.

Figure 3:
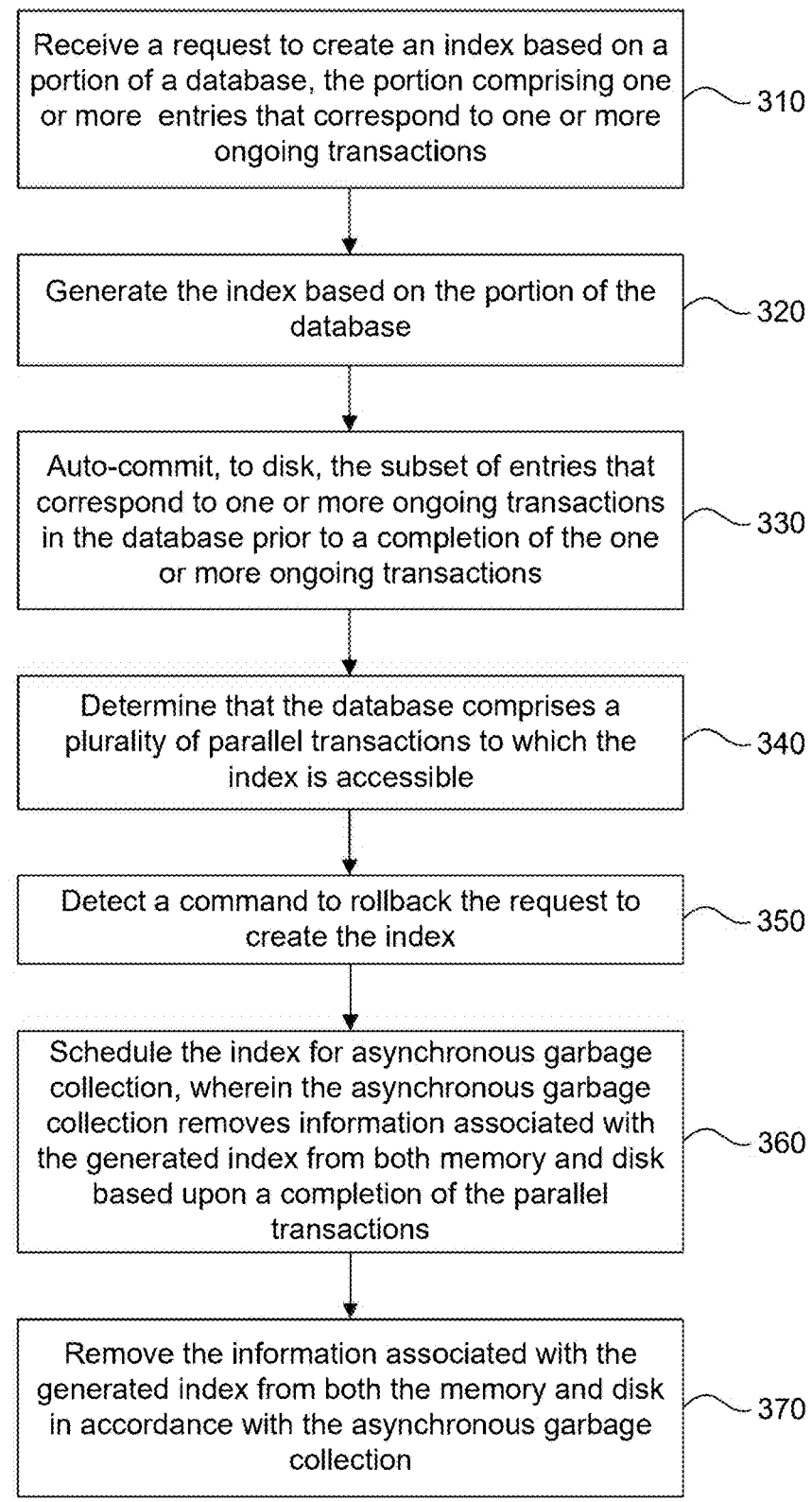
FIG. 3 is a flowchart illustrating example operations for providing a data storage management system (DMS), according to some embodiments.

FIG. 3 is a flowchart 300 illustrating example operations for providing a data storage management system (DMS) 102, according to some embodiments. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art. Method 300 shall be described with reference to FIG. 1.

In 310, a request to create an index based on a portion of a database is received, the portion comprising one or more entries that correspond to one or more ongoing transactions. For example, DMS 102 may receive request 114. The request 114 may include a command to create an index on table 112 of database 110. However, table 112 may include data written by one or more ongoing transactions (e.g., which have not yet completed or been committed to disk 106).

In 320, the index based is generated on the portion of the database. For example, object creator 126 may create the index 108. As illustrated in FIG. 2A, the creation of index 108 may include the creation of catalog 220 (including both in-memory log catalog 221 and on-disk catalog 222) and index bucket 224 (including both structure 225 and one or more checkpoints 226).

In 330, the subset of entries that correspond to one or more ongoing transactions in the database is auto-committed to disk prior to a completion of the one or more ongoing transactions. For example, as illustrated in FIG. 2A, the checkpoint 226 illustrates an auto-commit of the entries from structure 225, in memory 104, to disk 106.

In 340, it is determined that the database comprises a plurality of parallel transactions to which the index is accessible. For example, database 110 may include multiple ongoing transactions (not shown), any one of which that was received after the creation of index 108, may have access the data of index 108, including the auto-committed data.

In 350, a command to rollback the request to create the index is detected. For example, DMS 102 may receive a rollback command 210 from a user, or detect an event that triggers a rollback such as an error, failure, or crash.

In 360, the index is scheduled for asynchronous garbage collection, wherein the asynchronous garbage collection removes information associated with the generated index from both memory and disk based upon a completion of the parallel transactions. For example, the data of index 108 may be marked as not visible or rolled back (as illustrated in FIG. 2B), and a cleanup entry 120 may be attached to a subsequent transaction (after the rollback command).

In 370, the information associated with the generated index is removed from both the memory and disk in accordance with the asynchronous garbage collection. For example, upon the completion of the subsequent transaction, a CTS (commit timestamp) may be assigned to the cleanup entry 120 and when the minRead timestamp 124 is greater than the CTS of the cleanup entry 120, the data from disk 106 (and memory 104) corresponding to the index 108 may be removed, and the storage space freed for other data and transactions.

Figure 4:
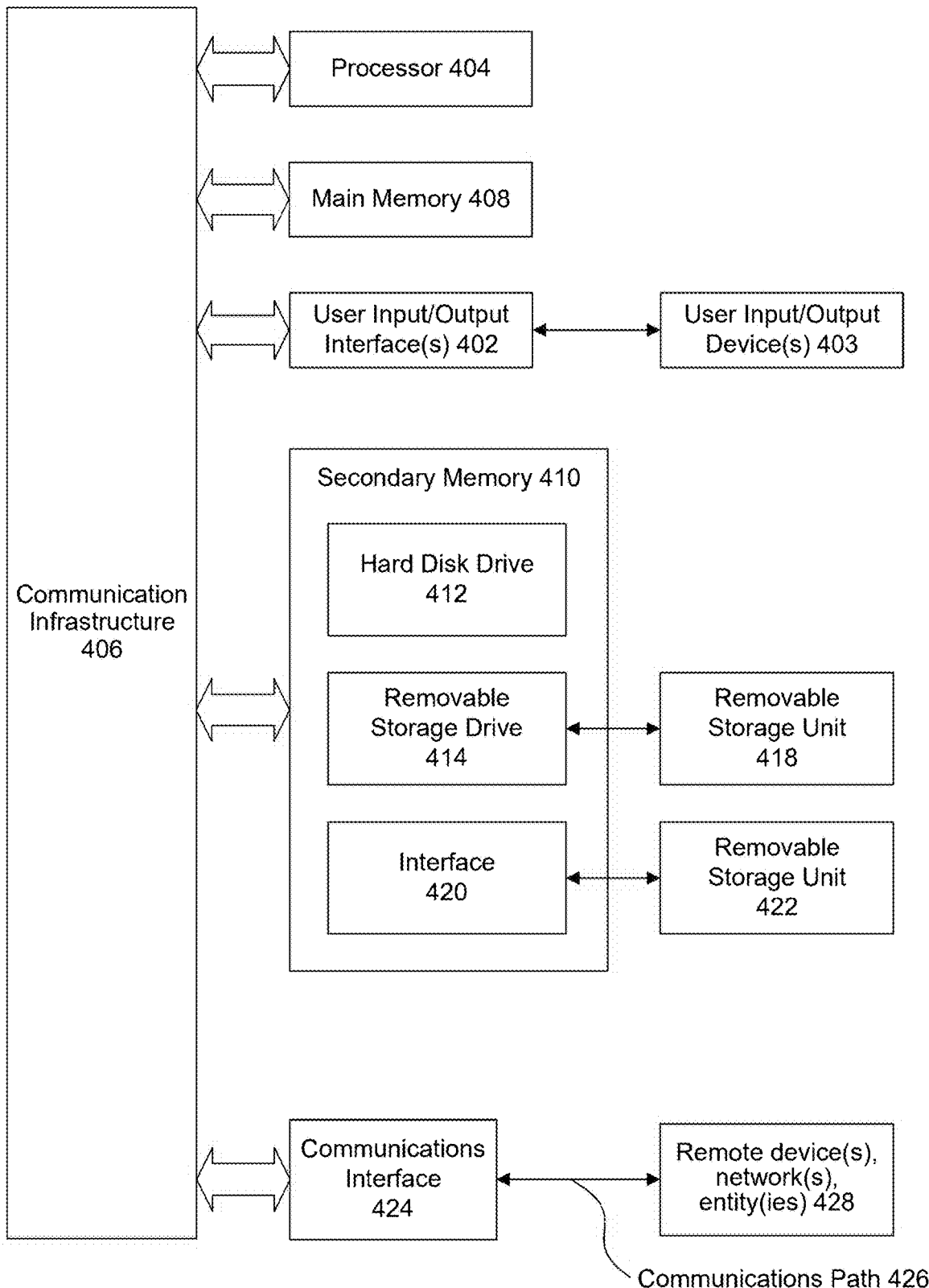
FIG. 4 is example computer system useful for implementing various embodiments.

Various embodiments may be implemented, for example, using one or more well-known computer systems, such as computer system 400 shown in FIG. 4. One or more computer systems 400 may be used, for example, to implement any of the embodiments discussed herein, as well as combinations and sub-combinations thereof.

Computer system 400 may include one or more processors (also called central processing units, or CPUs), such as a processor 404. Processor 404 may be connected to a communication infrastructure or bus 406.

Computer system 400 may also include user input/output device(s) 403, such as monitors, keyboards, pointing devices, etc., which may communicate with communication infrastructure 406 through user input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method comprising:
receiving a request to create an index based on a portion of a database, the portion of the database comprising one or more entries that correspond to one or more ongoing transactions;
responsive to the request to create the index:
generating the index based on the portion of the database, and
auto-committing to disk a subset of entries that correspond to one or more ongoing transactions in the database prior to a completion of the one or more ongoing transactions;
determining that the database comprises a plurality of parallel transactions to which the index is accessible;
detecting, after the auto-committing, a command to rollback the request to create the index;
scheduling the index for asynchronous garbage collection, wherein the asynchronous garbage collection removes information associated with the index from both a memory and the disk based upon a completion of the plurality of parallel transactions; and
removing the information associated with the index from both the memory and the disk in accordance with the asynchronous garbage collection.

2. The computer-implemented method of claim 1, wherein an entry is generated, in the memory, responsive to the request to create the index, the entry comprising a status of the index.

3. The computer-implemented method of claim 2, further comprising:
updating the status of the index, in the memory, responsive to detecting the command to rollback.

4. The computer-implemented method of claim 3, wherein the scheduling comprises:
identifying the index to be garbage collected based on the status of the index in the memory.

5. The computer-implemented method of claim 4, further comprising:
updating the status of the index, in the memory, responsive to identifying the index to be garbage collected and prior to removing the information associated with the index from the disk.

6. The computer-implemented method of claim 1, wherein the removing comprises:
detecting that a minimum read timestamp associated with an ongoing transaction on the database is greater than a timestamp associated with the request to create the index.

7. The computer-implemented method of claim 1, wherein the removing comprises:
removing the information from the disk upon a startup process of a computing device corresponding to the disk.

8. The computer-implemented method of claim 1, wherein the detecting comprises detecting a failure or error condition in the generating of the index.

9. A system comprising:
a memory; and
at least one processor coupled to the memory and configured to perform operations comprising:
receiving a request to create an index based on a portion of a database, the portion of the database comprising one or more entries that correspond to one or more ongoing transactions;
responsive to the request to create the index:
generating the index based on the portion of the database, and
auto-committing to disk a subset of entries that correspond to one or more ongoing transactions in the database prior to a completion of the one or more ongoing transactions;
determining that the database comprises a plurality of parallel transactions to which the index is accessible;
detecting, after the auto-committing, a command to rollback the request to create the index;
scheduling the index for asynchronous garbage collection, wherein the asynchronous garbage collection removes information associated with the index from both the memory and the disk based upon a completion of the plurality of parallel transactions; and
removing the information associated with the index from both the memory and the disk in accordance with the asynchronous garbage collection.

10. The system of claim 9, wherein an entry is generated, in the memory, responsive to the request to create the index, the entry comprising a status of the index.

11. The system of claim 10, the operations further comprising:
updating the status of the index, in the memory, responsive to detecting the command to rollback.

12. The system of claim 11, wherein the scheduling comprises:
identifying the index to be garbage collected based on the status of the index in the memory.

13. The system of claim 12, the operations further comprising:
updating the status of the index, in the memory, responsive to identifying the index to be garbage collected and prior to removing the information associated with the index from the disk.

14. The system of claim 9, wherein the removing comprises:
detecting that a minimum read timestamp associated with an ongoing transaction on the database is greater than a timestamp associated with the request to create the index.

15. The system of claim 9, wherein the removing comprises:
removing the information from the disk upon a startup process of a computing device corresponding to the disk.

16. The system of claim 9, wherein the detecting comprises detecting a failure or error condition in the generating of the index.

17. A non-transitory computer-readable medium having instructions stored thereon that, when executed by at least one computing device, cause the at least one computing device to perform operations comprising:

receiving a request to create an index based on a portion of a database, the portion of the database comprising one or more entries that correspond to one or more ongoing transactions;

responsive to the request to create the index:
- generating the index based on the portion of the database, and
- auto-committing to disk a subset of entries that correspond to one or more ongoing transactions in the database prior to a completion of the one or more ongoing transactions;

determining that the database comprises a plurality of parallel transactions to which the index is accessible;

detecting, after the auto-committing, a command to rollback the request to create the index;

scheduling the index for asynchronous garbage collection, wherein the asynchronous garbage collection removes information associated with the index from both a memory and the disk based upon a completion of the plurality of parallel transactions; and removing the information associated with the index from both the memory and the disk in accordance with the asynchronous garbage collection.

18. The non-transitory computer-readable medium of claim 17, wherein an entry is generated, in the memory, responsive to the request to create the index, the entry comprising a status of the index.

19. The non-transitory computer-readable medium of claim 18, the operations further comprising:
- updating the status of the index, in the memory, responsive to detecting the command to rollback.

20. The non-transitory computer-readable medium of claim 19, wherein the scheduling comprises:
- identifying the index to be garbage collected based on the status of the index in the memory.

* * * * *